(12) United States Patent
Gostev

(10) Patent No.: US 12,321,238 B2
(45) Date of Patent: Jun. 3, 2025

(54) USER AUTHORIZATION FOR FILE LEVEL RESTORATION FROM IMAGE LEVEL BACKUPS

(71) Applicant: VEEAM SOFTWARE AG, Baar (CH)

(72) Inventor: Anton Gostev, Saint-Petersburg (RU)

(73) Assignee: VEEAM SOFTWARE AG, Baar (CH)

( * ) Notice: Subject to any disclaimer, the term of this patent is extended or adjusted under 35 U.S.C. 154(b) by 0 days.

(21) Appl. No.: 18/387,727

(22) Filed: Nov. 7, 2023

(65) Prior Publication Data

US 2024/0070030 A1    Feb. 29, 2024

Related U.S. Application Data

(63) Continuation of application No. 17/329,732, filed on May 25, 2021, now Pat. No. 11,860,738, and a (Continued)

(51) Int. Cl.
*G06F 11/14* (2006.01)
*G06F 16/27* (2019.01)
(Continued)

(52) U.S. Cl.
CPC ...... *G06F 11/1448* (2013.01); *G06F 11/1461* (2013.01); *G06F 11/1469* (2013.01);
(Continued)

(58) Field of Classification Search
CPC ............... G06F 11/1448; G06F 11/461; G06F 11/1469; G06F 16/27; G06F 21/21;
(Continued)

(56) References Cited

U.S. PATENT DOCUMENTS 6,728,711 B2   4/2004  Richard
7,506,162 B1   3/2009  Hsu et al.
(Continued)

FOREIGN PATENT DOCUMENTS

CN        101409642 A    4/2009
CN        105072107 A    11/2015
WO    WO 2009038535 A1    3/2009

*Primary Examiner* — Hee K Song
(74) *Attorney, Agent, or Firm* — Sterne, Kessler, Goldstein & Fox P.L.L.C.

(57) ABSTRACT

Embodiments provide systems, methods, and computer program products for enabling user authorization to perform a file level recovery from an image level backup of a virtual machine without the need for access control by an administrator. Specifically, embodiments enable an access control mechanism for controlling access to stored image level backups of a virtual machine. In an embodiment, the virtual machine includes a backup application user interface that can be used to send a restoration request to a backup server. The restoration request can include a machine identifier and a user identifier of the user logged onto the virtual machine. The backup server includes a backup application that determines whether or not the machine identifier contained in the restoration request can be matched to a machine identifier of a virtual machine present in one of the virtual machine backups stored on the backup server.

17 Claims, 10 Drawing Sheets

Related U.S. Application Data continuation of application No. 16/552,720, filed on Aug. 27, 2019, now Pat. No. 11,016,856, which is a continuation of application No. 14/831,576, filed on Aug. 20, 2015, now Pat. No. 10,394,657.

(60) Provisional application No. 62/040,295, filed on Aug. 21, 2014.

(51) Int. Cl.

| | | |
|---|---|---|
| *G06F 21/31* | (2013.01) | |
| *G06F 21/33* | (2013.01) | |
| *G06F 21/62* | (2013.01) | |
| *H04L 9/40* | (2022.01) | |

(52) U.S. Cl.
CPC .............. *G06F 16/27* (2019.01); *G06F 21/31* (2013.01); *G06F 21/335* (2013.01); *G06F 21/6218* (2013.01); *G06F 21/629* (2013.01); *H04L 63/102* (2013.01); *G06F 2201/815* (2013.01); *G06F 2201/86* (2013.01)

(58) Field of Classification Search
CPC .. G06F 21/335; G06F 21/6218; G06F 21/629; G06F 2201/815; G06F 2201/86; H04L 63/102
See application file for complete search history.

(56) References Cited

U.S. PATENT DOCUMENTS

| | | | |
|---|---|---|---|
| 8,666,945 | B1 | 3/2014 | Smith |
| 8,843,922 | B2 | 9/2014 | Takahashi |
| 9,092,248 | B1 | 7/2015 | Makin et al. |
| 9,104,331 | B2* | 8/2015 | Hsu ............... G06F 11/1448 |
| 9,424,056 | B1 | 8/2016 | Bachu et al. |
| 9,529,806 | B1 | 12/2016 | Sumant et al. |
| 9,557,932 | B1 | 1/2017 | Chopra et al. |
| 9,652,178 | B2 | 5/2017 | Mohl |
| 9,996,425 | B2 | 6/2018 | Shulga et al. |
| 10,394,657 | B2 | 8/2019 | Gostev |
| 11,016,856 | B2 | 5/2021 | Gostev |
| 11,860,738 | B2 | 1/2024 | Gostev |
| 2009/0216970 | A1* | 8/2009 | Basler ............... G06F 11/1456 |
| | | | 711/E12.103 |
| 2009/0313447 | A1 | 12/2009 | Nguyen et al. |
| 2010/0070725 | A1* | 3/2010 | Prahlad ............ G06F 11/1453 |
| | | | 718/1 |
| 2010/0082552 | A1 | 4/2010 | Beatty et al. |
| 2010/0146231 | A1 | 6/2010 | Gopalan et al. |
| 2010/0198730 | A1 | 8/2010 | Ahmed et al. |
| 2011/0145199 | A1 | 6/2011 | Prasad Palagummi |
| 2012/0017114 | A1 | 1/2012 | Timashev et al. |
| 2012/0072685 | A1 | 3/2012 | Otani |
| 2013/0086656 | A1 | 4/2013 | Paddon et al. |
| 2013/0191341 | A1 | 7/2013 | Alexander et al. |
| 2014/0095816 | A1 | 4/2014 | Hsu et al. |
| 2014/0095817 | A1 | 4/2014 | Hsu et al. |
| 2016/0055064 | A1 | 2/2016 | Gostev |
| 2020/0097365 | A1 | 3/2020 | Gostev |

* cited by examiner

USER AUTHORIZATION FOR FILE LEVEL RESTORATION FROM IMAGE LEVEL BACKUPS

CROSS-REFERENCE TO RELATED APPLICATIONS

This application is a U.S. Nonprovisional Application is a continuation of U.S. application Ser. No. 17/329,732 filed on May 25, 2021, which is a continuation of U.S. application Ser. No. 16/552,720 filed on Aug. 27, 2019, now U.S. Pat. No. 11,016,856, which is a continuation of U.S. application Ser. No. 14/831,576 filed on Aug. 20, 2015, now U.S. Pat. No. 10,394,657, issued Aug. 27, 2019, which claims the benefit of U.S. Provisional Application No. 62/040,295 filed on Aug. 21, 2014, which are incorporated herein by reference in its entirety.

BACKGROUND

Technical Field

The present disclosure relates generally to image level data protection, and more particularly to providing user authorization during self-service file-level restoration from image level backups and replicas.

Background Art

To prevent information loss, organizations generally implement a recovery plan that enables periodic backup of physical and virtual machines, and recovery of entire machines, individual data files, folders and application items.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings Generally, the drawing in which an element first appears is typically indicated by the leftmost digit(s) in the corresponding reference number.

DETAILED DESCRIPTION OF EMBODIMENTS

According to some approaches, an image-level backup may be used to backup a physical or virtual machine (VM). This description will use a virtual machine as an non-limiting example. However, as would be understood by a person of skill in the art, embodiments are not limited to the use with virtual machines and may also be used with physical machines, for example. In case of VM, this may be accomplished by using a hypervisor snapshot (VM snapshot) of the VM. The VM snapshot may be used to create a complete copy of a VM image for backup purposes.

Existing backup solutions, such as Veeam Backup & Replication, enable restoring both the whole VM image, and individual files from image level backups without restoring the whole VM image.

Figure 1:
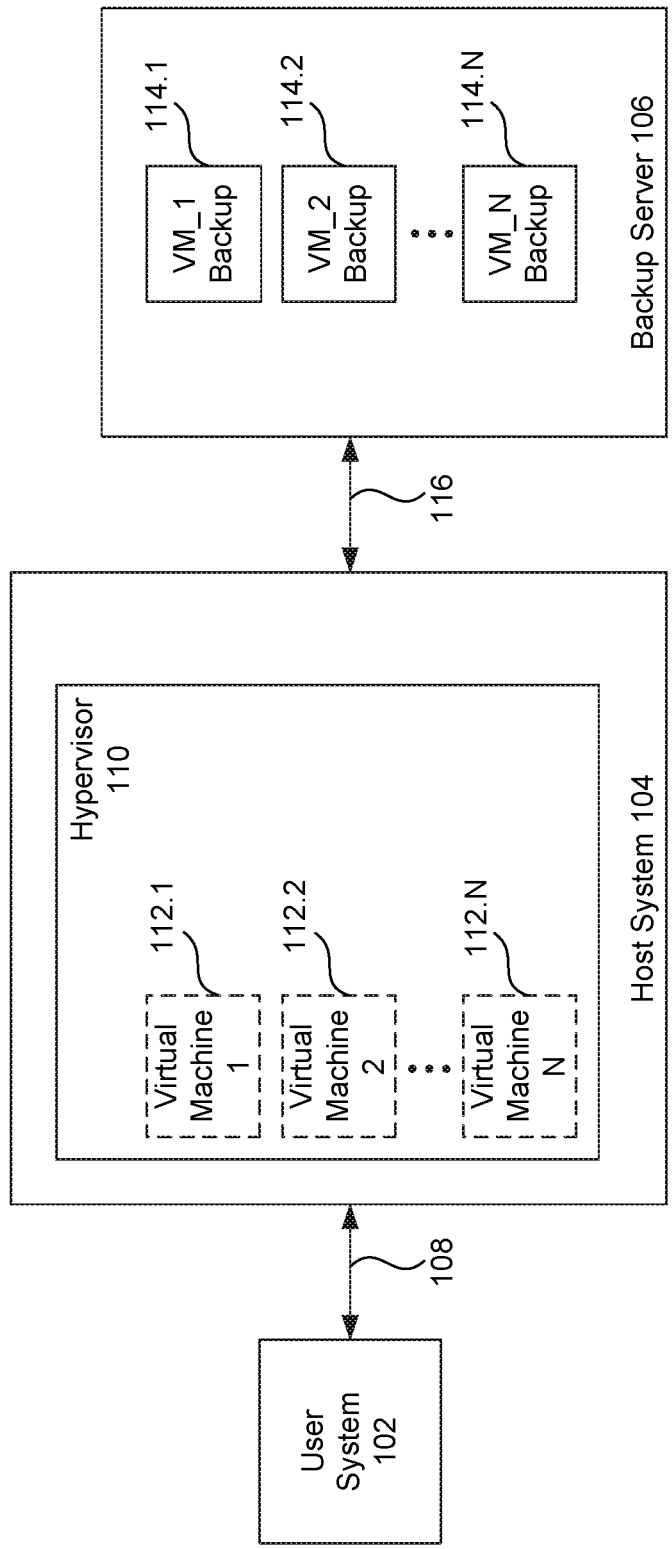
FIG. 1 illustrates an example environment in which embodiments can be practiced or implemented.

FIG. 1 illustrates an example environment 100 in which embodiments can be practiced or implemented. Example environment 100 is provided for the purpose of illustration only and is not limiting of embodiments. As shown in FIG. 1, example environment 100 includes a user system 102, a host system 104, and a backup server 106. Host system 104 is connected to user system 102 via an interface 108 and to backup server 106 via an interface 116.

User system 102 can be any computing device, such as a personal computer, smartphone, or tablet, to name a few examples. Host system 104 can be a server that enables various services and applications. In one embodiment, host system 104 includes a hypervisor 110, which enables a plurality of virtual machines 112.1, 112.2, ..., 112.N. In an embodiment, hypervisor 110 includes a virtual machine monitor configured to launch and run virtual machines. Hypervisor 110 can be implemented in software, hardware, or firmware. For example, hypervisor 110 can be a VMware® vSphere hypervisor or a Microsoft® Hyper-V hypervisor.

Backup server 106 is a physical or virtual machine that performs the role of a configuration and control center, performing various types of administrative activities (such as coordinating backup, replication tasks, controlling backup scheduling and resource allocating).

In addition, backup server 106 can be used to store image-level backups. For example, as shown in FIG. 1, backup server 106 can store image level backups 114.1, 114.2, ..., 114.N of virtual machines 112.1, 112.2, ..., 112.N respectively. Alternatively, image level backups can be stored on another server, network attached storage device (NAS), or storage area network (SAN).

A user of user system 102 can have access privileges to one or more of virtual machines 112.1, 112.2, ..., 112.N. For example, if the user of user system 102 has access privileges to virtual machine 112.1, the user of user system 102 can log onto virtual machine 112.1 by providing its user credentials (login, password) to virtual machine 112.1.

At times, the user of user system 102 may need to restore data from an image level backup of a virtual machine that it has access to. This is typically done by restoring an image (or a portion thereof) of the virtual machine from a backup file. In some systems, data restoration privileges are either subject to no restrictions, or limited to backup administrators only. The former approach creates security and privacy concerns since individual data, which may contain personal information, can be accessed/restored from an image level backup of the virtual machine by more than one user. The latter approach can create a large work load for administrators. For example, administrators typically respond to a user restoration request by performing the restoration themselves. This can be time consuming, and also inefficient as it requires the availability of the administrator when the user has a need for restoring, and that the administrator is able to locate the required file within the user folders. Other approaches include creating a restoration team dedicated for handling restoration requests. However, this approach can be expensive and can create a privacy issue since the personnel of the restoration team will be able to access the user's contents of the image level backup of the virtual machine.

Embodiments, as further described below, include but are not limited to systems, methods, and computer program products for enabling user authorization during file level restore from an image level backup without the need for access control by a backup administrator. Specifically, example embodiments enable an access control mechanism for controlling access to stored virtual machine images by users in the system. In an embodiment, the virtual machine includes a backup application user interface that can be used to send a restoration request to a backup server. The restoration request can include machine identifier and a user identifier of the user logged onto the virtual machine. The machine identifier can be a DNS name, IP address assigned to virtual machine, hypervisor-level VM identifier, and similar. In another embodiment, machine identifier can be automatically detected by matching computer account (such as Active Directory computer account) to a VM. The user identifier can be the login information of the user logged onto the virtual machine, user token, or similar. The backup application can access and restore data from virtual machine backups, and can accept or deny the restoration request based on certain one or more criteria, for example whether or not machine identifier contained in restoration request can be matched to the machine identifier of virtual machine present in one of the virtual machine backups stored on backup server, or the user belongs to the certain access control group in the OS of virtual machine. In an embodiment, the access control group is a local administrators group.

Figure 2:
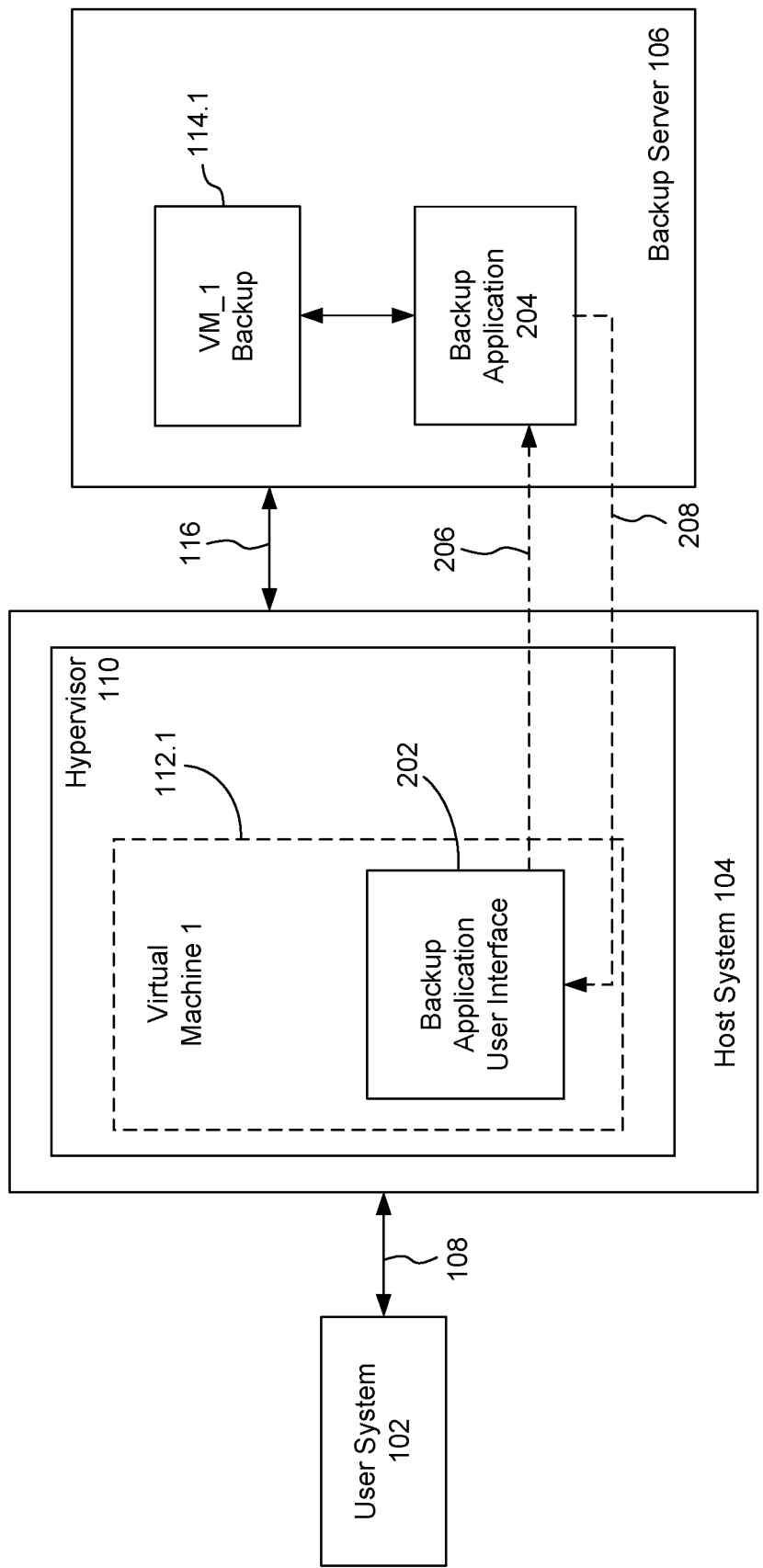
FIG. 2 illustrates an example system according to an embodiment.

FIG. 2 illustrates an example system 200 according to an embodiment. Example system 200 is provided for the purpose of illustration only, and is not limiting of embodiments. As shown in FIG. 2, example system 200 includes a user system 102, a host system 104, and a backup server 106. Host system 104 includes a hypervisor 110, which enables one or more virtual machines, such as virtual machine 112.1. Host system 104 is connected to user system 102 via an interface 108 and to backup server 106 via an interface 116.

In the example embodiments, backup server 106 also stores image level backups for one or more virtual machines on locally attached storage. For example, backup server 106 stores virtual machine image level backup VM_1 Backup 114.1 of virtual machine 112.1. In addition, backup server 106 hosts a backup application 204. Backup application 204 can be used by users to backup virtual machines, such as virtual machine 112.1, to backup server 106 or to restore virtual machine images or portions thereof from virtual machine image level backup VM_1 Backup 114.1 stored on backup server 106.

In an embodiment, during backup or replication activity, backup application 204 saves to a database user accounts belonging to a certain access control group in the Operating System (OS) of Virtual Machines being backed up. In an embodiment, the access control group is a local administrators group. In an embodiment, the user accounts each include one or more user identifiers.

User system 102 can connect to host system 104 via interface 108 and a user of user system 102 can log onto virtual machine 112.1. When logged onto virtual machine 112.1, the user of user system 102 can run a backup application user interface 202 on virtual machine 112.1. Backup application user interface 202 is a user interface for backup application 204. In an embodiment, backup application user interface 202 is a web-based user interface, which can be accessed using an Internet browser.

User of user system 102 can use backup application user interface 202 of virtual machine 112.1 to send a restoration request 206 to backup server 106. In an embodiment, restoration request 206 includes a machine identifier of virtual machine 112.1 (on which backup application user interface 202 is running). The machine identifier can be a Domain Name System (DNS) name, an Internet Protocol (IP) address assigned to the virtual machine, a hypervisor-level VM identifier, or similar identifier. In another embodiment, the machine identifier can be automatically detected by matching a computer account (such as an Active Directory computer account) to a VM.

Backup application 204 is configured to receive restoration request 206 from virtual machine 112.1 over interface 116. Using the machine identifier contained in the restoration request, backup application 204 identifies whether the machine identifier contained in restoration request 206 can be matched to the machine identifier of virtual machine 112.1 present in virtual machine image level backup 114.1 stored on backup server 106. In an embodiment, if the machine identifier contained in restoration request 206 can be matched to the machine identifier of the virtual machine present in virtual machine image level backup 114.1 stored on backup server 106, the user who is currently logged on virtual machine 112.1 can access and restore objects (e.g., files, folders, directories, etc.) from virtual machine image level backup 114.1 of virtual machine 112.1 using user interface 202, which may be a web interface.

Backup application 204 then accepts or denies restoration request 206 based at least in part on whether the machine identifier contained in restoration request 206 can be matched to the machine identifier of virtual machine 112.1 present in virtual machine image level backup 114.1 stored on backup server 106. In an embodiment, backup application 204 accepts the restoration request if machine identifier contained in restoration request 206 can be matched to the machine identifier of virtual machine 112.1 present in virtual machine image level backup 114.1 stored on backup server 106 and denies the restoration request otherwise. A response (acceptance or denial) 208 to restoration request 206 is then sent to backup application user interface 202. If response 208 is a denial, backup application user interface 202 displays a request denied message to the user. Otherwise, backup application user interface 202 provides an interface for accessing image level backup VM_1 Backup 114.1 of virtual machine 112.1. The interface can include a view for selecting objects for restoration from image level backup VM_1 Backup 114.1.

Figure 3:
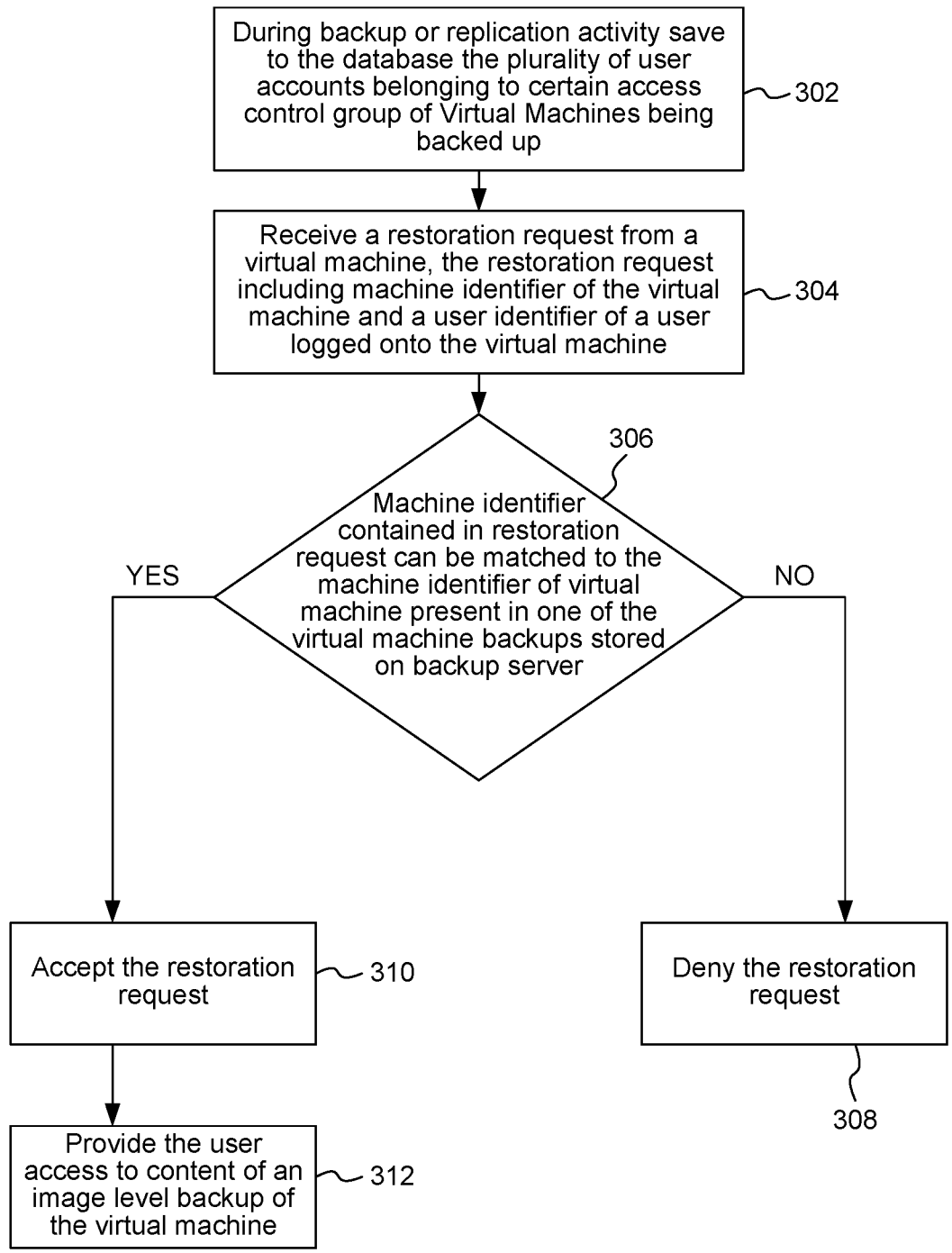
FIG. 3 is an example process according to an embodiment.

FIG. 3 is an example process 300 according to an embodiment. Example process 300 is provided for the purpose of illustration only and is not limiting of embodiments. Example process 300 can be performed by a backup server, such as backup server 106, and more particularly a backup application, such as backup application 204.

As shown in FIG. 3, example process 300 begins in step 302, which includes saving, during backup or replication activity, to a database user accounts belonging to a certain access control group in the OS of Virtual Machines being backed up. In an embodiment, the access control group is local administrators group.

Subsequently, process 300 proceeds to step 304, which includes receiving a restoration request from a virtual machine. In an embodiment, the restoration request includes machine identifier. The machine identifier can be DNS name, IP address assigned to virtual machine, hypervisor-level VM identifier, and similar. In another embodiment, VM identifier can be automatically detected by matching computer account (such as Active Directory computer account) to a VM.

Subsequently, process 300 proceeds to step 306, which includes determining whether the machine identifier contained in restoration request 206 can be matched to the machine identifier of a virtual machine present in one of the virtual machine backups stored on backup server. If the answer is no, process 300 proceeds to step 308, which includes denying the restoration request. Otherwise, process 300 proceeds to step 310, which includes accepting the restoration, and then to step 312, which includes providing the user access to content of an image level backup of the virtual machine.

Figure 4:
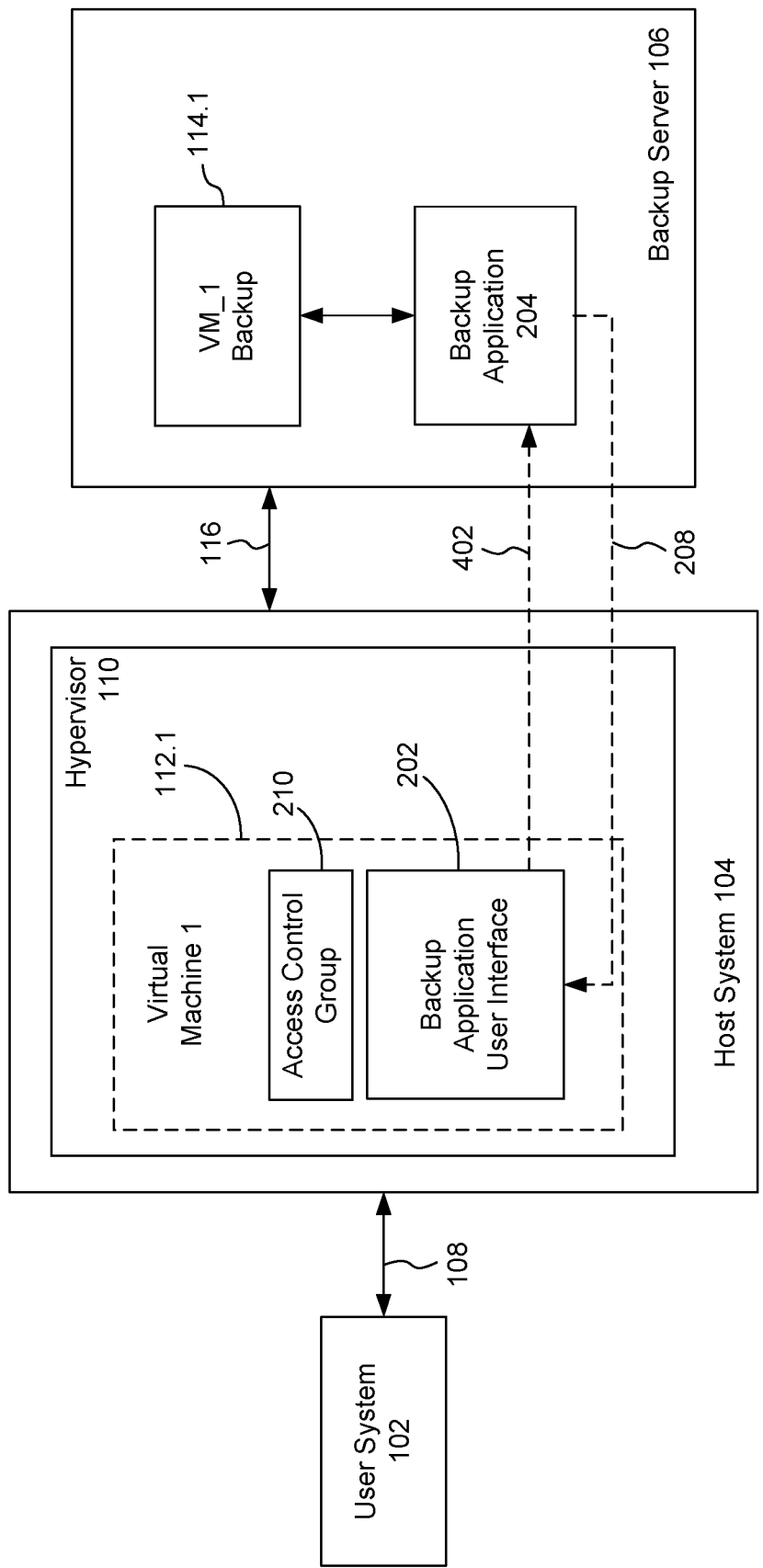
FIG. 4 illustrates another example system according to an embodiment.

FIG. 4 illustrates another example system 400 according to an embodiment. Example system 400 is provided for the purpose of illustration only and is not limiting of embodiments. As shown in FIG. 4, example system 400 includes a user system 102, a host system 104, and a backup server 106. Host system 104 includes a hypervisor 110, which enables one or more virtual machines, such as virtual machine 112.1. Host system 104 is connected to user system 102 via an interface 108 and to backup server 106 via an interface 116.

As described above with respect to example system 200, backup server 106 stores image level backups of one or more virtual machines. For example, backup server 106 stores image level backup VM_1 Backup 114.1 of virtual machine 112.1. Backup server 106 also hosts a backup application 204, which can be used by users to backup virtual machines, such as virtual machine 112.1, to backup server 106 or to restore virtual machine images or portions thereof, from image level backup VM_1 Backup 114.1, from backup server 106.

In an embodiment, during backup or replication activity, backup application 204 saves to a database user accounts belonging to a certain access control group in the OS of Virtual Machines being backed up. In an embodiment, the access control group is a local administrators group In an embodiment, a user of user system 102 can use backup application user interface 202 of virtual machine 112.1 to send a restoration request 402 to backup server 106. In an embodiment, restoration request 402 includes a machine identifier of virtual machine 112.1 (on which backup application user interface 202 is running), and a user identifier of the user logged onto virtual machine 112.1. The user identifier can be the login information of the user logged onto the virtual machine, a user token, or similar identifier.

In an embodiment, as described above with reference to FIG. 2, backup application 204 is configured to use the machine identifier of virtual machine 112.1 contained in restoration request 402 to match it to the machine identifier of virtual machine 112.1 present in virtual machine image level backup 114.1 stored on backup server 106. Backup application 204 then accepts or denies restoration request 402 based at least in part whether machine identifier contained in restoration request 206 can be matched to the machine identifier of virtual machine 112.1 present in virtual machine image level backup 114.1 stored on backup server 106. In an embodiment, backup application 204 denies restoration request 402 if the machine identifier contained in restoration request 206 cannot be matched to the machine identifier of virtual machine 112.1 present in virtual machine image level backup 114.1 stored on backup server 106

In an embodiment, if the machine identifier machine identifier contained in restoration request 206 can be matched to the machine identifier of virtual machine 112.1 present in virtual machine image level backup 114.1 stored on backup server 106, backup application 204 is then configured to determine whether or not the user identifier, contained in the restoration request, belongs to access control group 210 in the OS. In an embodiment, access control group 210 is a local administrators group. Backup application 204 then accepts or denies restoration request 402 based at least in part on whether or not the user identifier, contained in the request, belongs to access control group 210 of virtual machine 112.1. In an embodiment, backup application 204 denies restoration request 402 if the user identifier does not belong to access control group 210. A response 208 denying the restoration request is then sent to backup application user interface 202.

If response 208 includes a denial, response 208 can indicate to the user via backup application user interface 202 that the reason for denial is that user identifier does not belong to access control group 210. In an embodiment, access control group 210 is a local administrators group. Otherwise, if restoration request 402 is accepted, then backup application user interface 202 provides an interface for accessing the content of image level backup VM_1 Backup 114.1 of virtual machine 112.1. The interface can include a view for selecting objects for restoration from image level backup VM_1 Backup 114.1.

In an embodiment, the user identifier can be a user token. Backup application 204 uses the user token to determine whether or not the user identifier, contained in the restoration request, belongs to access control group 210. In an embodiment, the access control group is local administrators group. For example, in case of Microsoft Windows being an operating system of virtual machine 111.2, the user token contains information regarding SIDs of users group that the user belongs to.

Figure 5:
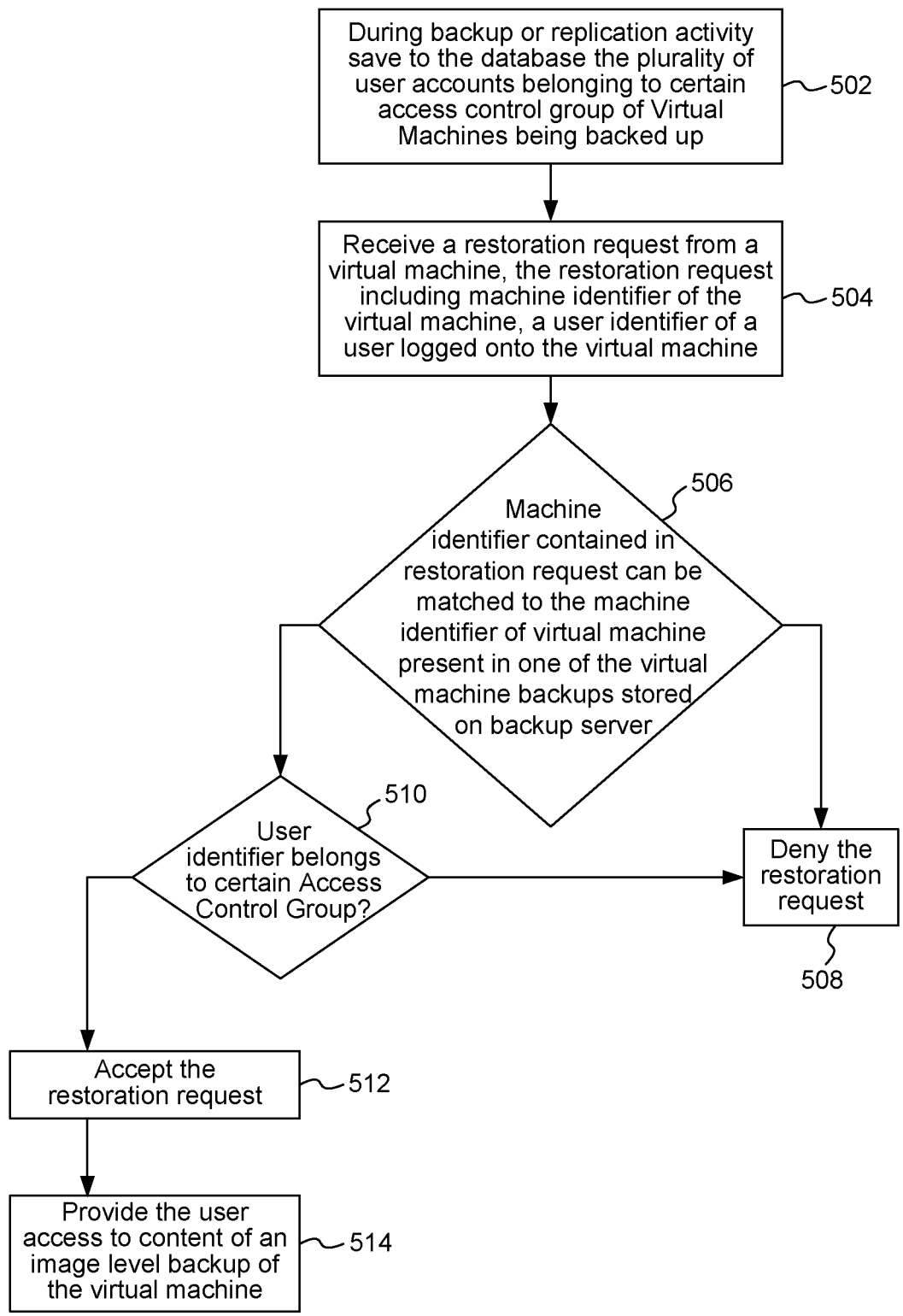
FIG. 5 is another example process according to an embodiment.

FIG. 5 is another example process 500 according to an embodiment. Example process 500 is provided for the purpose of illustration only and is not limiting of embodiments. Example process 500 can be performed by a backup server, such as backup server 106, and more particularly by a backup application, such as backup application 204.

As shown in FIG. 5, example process 500 begins in step 502, which includes saving, during backup or replication activity, to a database user accounts belonging to a certain access control group in the OS of Virtual Machines being backed up. In an embodiment, the access control group is local administrators group.

Subsequently, example process 500 proceeds to in step 504, which includes receiving a restoration request from a virtual machine. In an embodiment, the restoration request includes a machine identifier and a user identifier of a user logged onto the virtual machine. The machine identifier can be a DNS name, an IP address assigned to virtual machine, a hypervisor-level VM identifier, or similar identifier. In another embodiment, a VM identifier can be automatically detected by matching a computer account (such as Active Directory computer account) to a VM.

Subsequently, process 500 proceeds to step 506, which includes determining whether the machine identifier contained in restoration request 206 can be matched to the machine identifier of a virtual machine present in one of the virtual machine image level backups stored on the backup server.

If the answer is no, process 500 proceeds to step 508, which includes denying the restoration request. Otherwise, process 500 proceeds to step 510.

In step 510, process 500 includes determining whether or not the user identifier, contained in the restoration request, belongs to the a certain access control group in the OS of the virtual machine. In an embodiment, the access control group is a local administrators group. If the answer is no, process 500 proceeds to step 508, which includes denying the restoration request. Otherwise, process 500 proceeds to step 512, which includes accepting the restoration request, and then to step 514 which includes providing the user access to content of an image level backup of the virtual machine.

Figure 6:
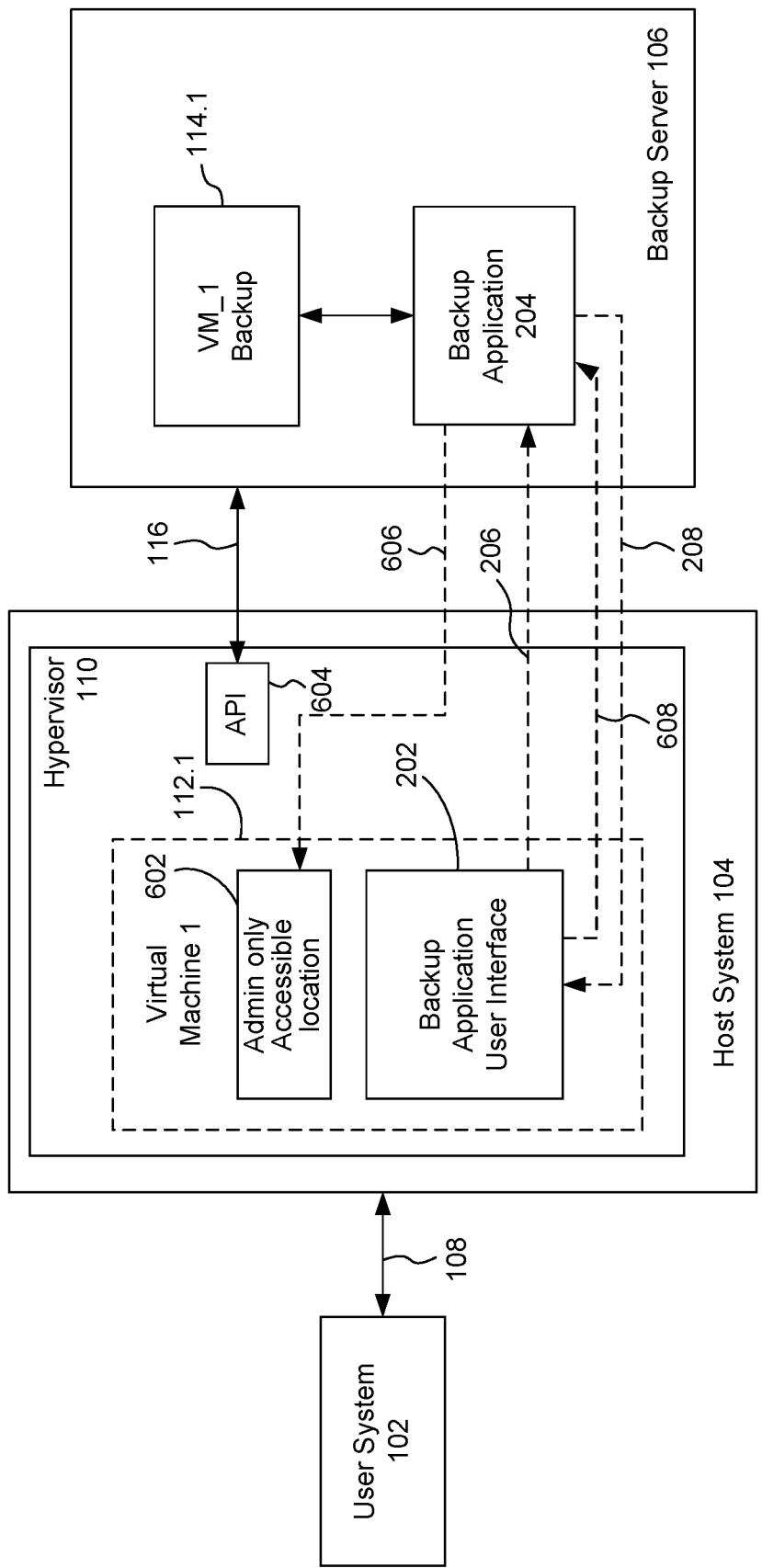
FIG. 6 illustrates another example system according to an embodiment.

FIG. 6 illustrates another example system 600 according to an embodiment. In this embodiment, an authorization code can be delivered to the user by placing it directly into the virtual machine 112 file system to a folder accessible to specific user or computer administrator only, such as home folder. Example system 600 is provided for the purpose of illustration only and is not limiting of embodiments.

As shown in FIG. 6, example system 600 includes a user system 102, a host system 104, and a backup server 106. Host system 104 includes a hypervisor 110, which enables one or more virtual machines, such as virtual machine 112.1. Host system 104 is connected to user system 102 via an interface 108 and to backup server 106 via an interface 116.

As described above with respect to example system 200, backup server 106 stores image level backups of virtual machines. For example, backup server 106 stores image level backup VM_1 Backup 114.1 of virtual machine 112.1. Backup server 106 also hosts a backup application 204, which can be used by users to backup virtual machines, such as virtual machine 112.1, to backup server 106 or to restore virtual machine images or portions thereof from image level backup VM_1Backup 114.1 stored on backup server 106.

In an embodiment, a user of user system 102 can use backup application user interface 202 of virtual machine 112.1 to send a restoration request 206 to backup server 106. In an embodiment, restoration request 206 includes a machine identifier 112.1 (on which backup application user interface 202 is running) and a user identifier of the user logged onto virtual machine 112.1. The user identifier can be the login information of the user logged onto the virtual machine, user token, or similar.

In an embodiment, backup application 204 is configured to use the machine identifier of virtual machine 112.1 contained in restoration request 402 to match it to the machine identifier of virtual machine 112.1 present in virtual machine image level backup 114.1 stored on backup server 106. Backup application 204 then accepts or denies restoration request 206 based at least in part on whether the machine identifier contained in restoration request 206 can be matched to the machine identifier of virtual machine 112.1 present in virtual machine image level backup 114.1 stored on backup server 106. In an embodiment, backup application 204 denies restoration request 402 if the machine identifier contained in restoration request 206 cannot be matched to the machine identifier of virtual machine 112.1 present in virtual machine image level backup 114.1 stored on backup server 106. A response 208 denying the restoration request is then sent to backup application user interface 202.

If the machine identifier contained in restoration request 206 can be matched to the machine identifier of virtual machine 112.1 present virtual machine image level backup 114.1 stored on backup server 106, backup application 204 is configured to write an authentication cookie 606 to an administrator-only accessible location 602 of virtual machine 112.1 and to prompt the user logged onto virtual machine 112.1 to provide the authentication cookie. In an embodiment, administrator-only accessible location 602 is a directory of virtual machine 112.1 that can only be accessed by users with administrative access privileges. A user authorized to access and restore objects (e.g., files, folders, directories, etc.) from image level backups of virtual machine 112.1 is part of this set of users and can therefore access and retrieve authentication cookie 606 from administration-only accessible location 602. In an embodiment, backup application 204 uses an API 604 provided by hypervisor 110 to write authentication cookie 606 to administrator-only accessible location 602 of virtual machine 112.1. For example, in the case of hypervisor 110 being a VMware® hypervisor, API 604 can be a VIX API, which provides a library for writing scripts and programs to manipulate virtual machines. In an embodiment, authentication cookie 606 can be written to administrator-only accessible location 602 of virtual machine 112.1 using the CreateTempFileInGuest operation of the VIX API, which copies a file or directory from backup server 106 to administrator-only accessible location 602 of virtual machine 112.1.

Backup application 204 is then configured to wait for the user logged onto virtual machine 112.1 to provide the authentication cookie via backup application user interface 202. If no authentication cookie is received by backup application 204 with a predetermined time interval, backup application 204 denies restoration request 206 and sends a denial response 208 to backup application user interface 202. Response 208 can indicate to the user via backup application user interface 202 that the reason for the denial is the expiration of the time to enter the authentication.

Figure 7:
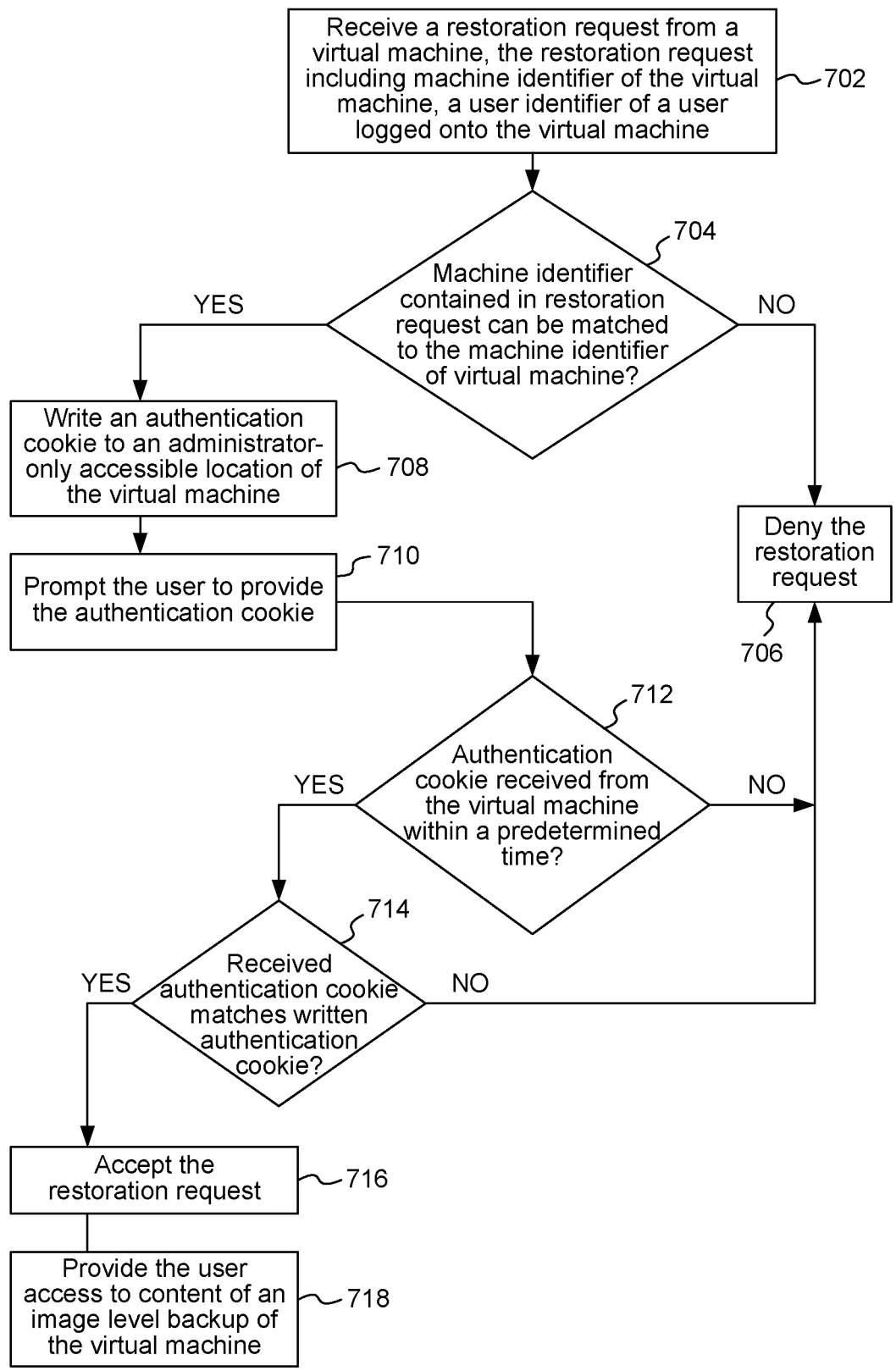
FIG. 7 is another example process according to an embodiment.

Otherwise, if an authentication cookie 608 is received by backup application 204 within the predetermined time interval, then backup application 204 accepts restoration request 206, if the received authentication cookie 608 matches the written authentication cookie 606 and denies restoration request 206, if the received authentication cookie 608 does not match the written authentication cookie 606. A response 208 accepting or denying restoration request 206 is then sent to backup application user interface 202. If response 208 includes a denial, response 208 can indicate to the user via backup application user interface 202 that the reason for denial is the entry of an incorrect/invalid authentication cookie. Otherwise, if restoration request 206 is accepted, then backup application user interface 202 provides an interface for accessing content of image level backup VM_1 Backup 114.1 of virtual machine 112.1. The interface can include a view for selecting objects for restoration from image level backup VM_1 Backup 114.1. FIG. 7 is another example process 700 according to an embodiment. Example process 700 is provided for the purpose of illustration only and is not limiting of embodiments. Example process 700 can be performed by a backup server, such as backup server 106, and more particularly a backup application, such as backup application 204. As shown in FIG. 7, example process 700 begins in step 702, which includes receiving a restoration request from a virtual machine. In an embodiment, the restoration request includes a machine identifier and a user identifier of a user logged onto the virtual machine.

Subsequently, in step 704, process 700 includes determining whether the machine identifier contained in the restoration request can be matched to the machine identifier of a virtual machine present in one of the virtual machine image level backups stored on the backup server. If the answer is no, process 700 proceeds to step 706, which includes denying the restoration request. Otherwise, process 700 proceeds to step 708.

In step 708, process 700 includes writing an authentication cookie to an administrator-only accessible location of the virtual machine. In an embodiment, the administrator-only accessible location is a directory of the virtual machine that can only be accessed by users with administrative access privileges. In an embodiment, the authentication cookie is written to the virtual machine using a VIX API provided by a VMware® hypervisor.

Subsequently, in step 710, process 700 includes prompting the user logged onto the virtual machine to provide the authentication cookie. A user authorized to access and restore objects (e.g., files, folders, directories, etc.) from image level backups of the virtual machine is part of the set of users that can access the administrator-only accessible location of the virtual machine, and can therefore access and retrieve the authentication cookie from the administrator-only accessible location.

Then, process 700 proceeds to step 712, in which the backup applications waits to receive an authentication cookie from the virtual machine. If no authentication cookie is received from the virtual machine within a predetermined time interval, process 700 proceeds to step 706, which includes denying the restoration request. Otherwise, process 700 proceeds to step 714.

In step 714, process 700 includes determining whether the received authentication cookie matches the written authorization code. If the is answer is no, process 700 proceeds to step 706. Otherwise, process 700 proceeds to step 716, which includes accepting the restoration request, and then to step 718, which includes providing the user access to content of image level backup of the virtual machine.

Figure 8:
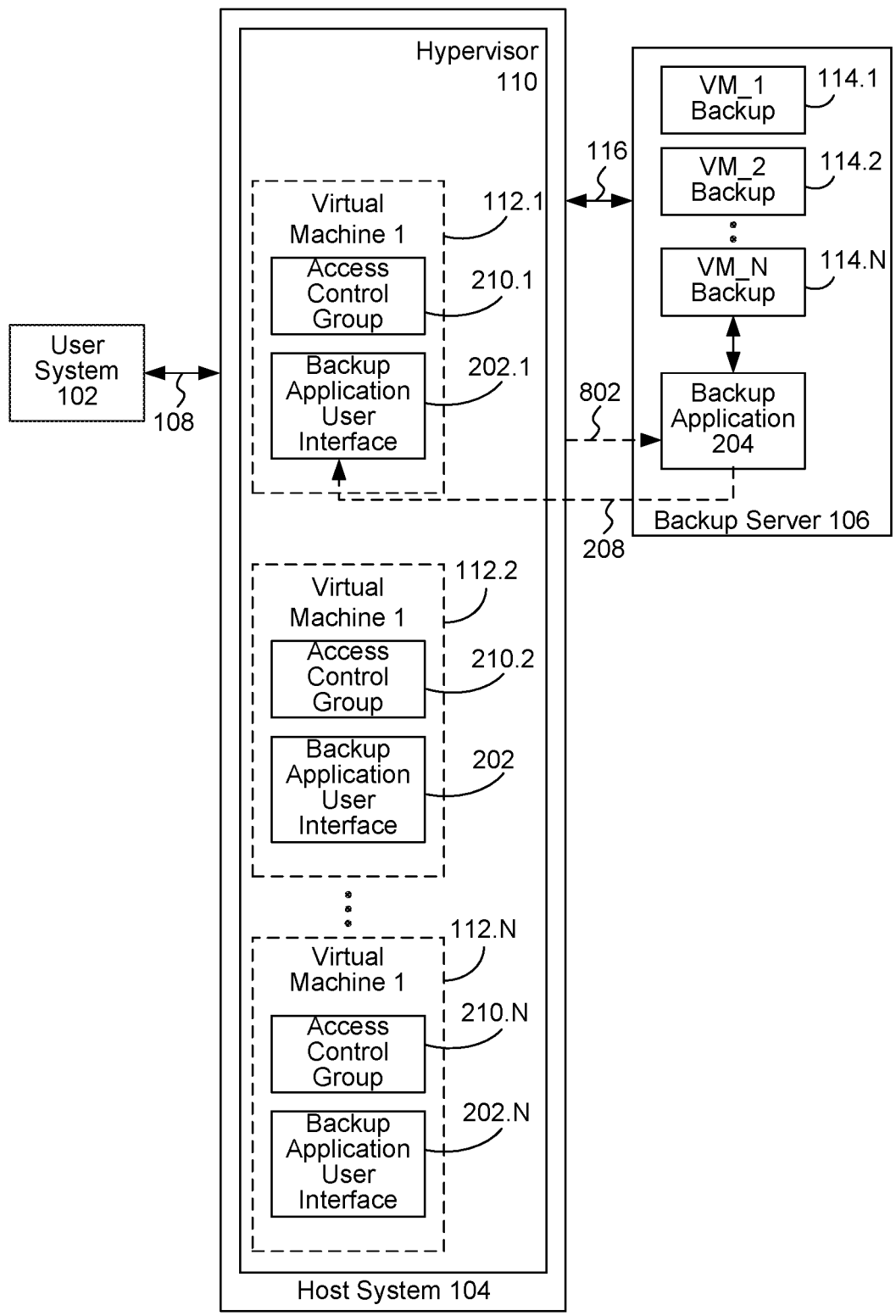
FIG. 8 illustrates another example system according to an embodiment.

FIG. 8 illustrates another example system 800 according to an embodiment. Example system 800 is provided for the purpose of illustration only and is not limiting of embodiments. As shown in FIG. 8, example system 800 includes a user system 102, a host system 104, and a backup server 106. Host system 104 includes a hypervisor 110, which enables one or more virtual machines, such as virtual machine 112.1, 112.2, . . . , 112.N. Host system 104 is connected to user system 102 via an interface 108 and to backup server 106 via an interface 116.

As described above with respect to example system 200, backup server 106 stores image level backups of one or more virtual machines. For example, backup server 106 can store image level backups 114.1, 114.2, . . . , 114.N of virtual machines 112.1, 112.2, . . . , 112.N respectively. Backup server 106 also hosts a backup application 204, which can be used by users to backup virtual machines, such as virtual machine 112.1, 112.2, . . . , 112.N to backup server 106 or to restore virtual machine images or portions thereof, from image level backups 114.1, 114.2, . . . , 114.N of virtual machines 112.1, 112.2, . . . , 112.N respectively, from backup server 106.

In an embodiment, during backup or replication activity, backup application 204 saves to a database user accounts belonging to a certain access control group in the OS of Virtual Machines being backed up. In an embodiment, the access control group is a local administrators group.

In an embodiment, a user of user system 102 can use backup application user interface 202.1, 202.2, . . . , 202.N of virtual machines 112.1, 112.2, . . . , 112.N to send a restoration request 802 to backup server 106. In an embodiment, restoration request 802 includes a machine identifier of virtual machine 112.1 (on which backup application user interface 202 is running), and a user identifier of the user logged onto virtual machine 112.1. The user identifier can be the login information of the user logged onto the virtual machine, a user token, or similar identifier.

In an embodiment, backup application 204 is configured to use the user identifier contained in the restoration request to match it to one of the user identifiers contained in the image level backups 114.1, 114.2, . . . , 114.N of virtual machines 112.1, 112.2, . . . , 112.N. Backup application 204 then accepts or denies restoration request 802 based at least in part on whether or not the user identifier contained in the restoration request can be matched to one or more of the user identifiers contained in the image level backups 114.1, 114.2, . . . , 114.N of virtual machines 112.1, 112.2, . . . , 112.N. In an embodiment, backup application 204 denies restoration request 402 if the user identifier contained in the restoration request cannot be matched to any of the user identifiers contained in the image level backups 114.1, 114.2, . . . , 114.N of virtual machines 112.1, 112.2, . . . , 112.N. A response 208 denying the restoration request is then sent to backup application user interface 202.

If response 208 includes a denial, response 208 can indicate to the user via backup application user interface 202 that the reason for denial is the user identifier contained in the restoration request cannot be matched to any of the user identifiers contained in the virtual machine image level backups 114.1, 114.2, . . . , 114.N of virtual machines 112.1, 112.2, . . . , 112.N respectively. Otherwise, if restoration request 402 is accepted, then backup application user interface 202 provides an interface for accessing the content of virtual machine image level backups 114.1, 114.2, . . . , 114.N of virtual machine 112.1, 112.2, . . . , 112.N. The interface can include a view for selecting objects for restoration from image level backups 114.1, 114.2, . . . , 114.N of virtual machines 112.1, 112.2, . . . , 112.N.

In an embodiment, backup application 204 can use the machine identifier contained in the restoration request to limit visible scope of content of image level backups. For example, using machine identifier contained in the restoration request, the backup application 204 can limit visible scope of image level backups to content of image level backup corresponding to the VM that the restoration request came from.

Figure 9:
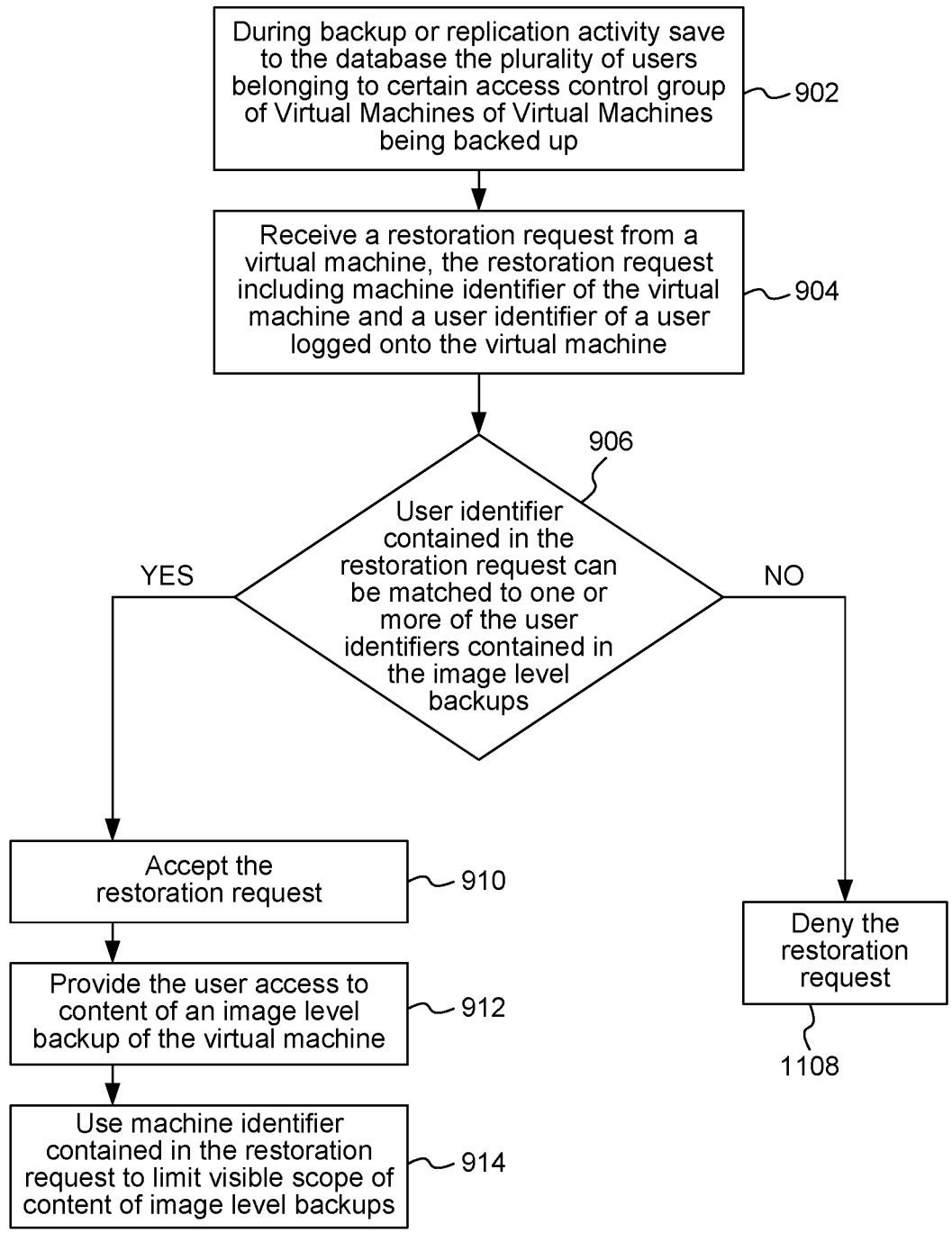
FIG. 9 is another example process according to an embodiment.

FIG. 9 is an example process 900 according to an embodiment. Example process 900 is provided for the purpose of illustration only and is not limiting of embodiments. Example process 900 can be performed by a backup server, such as backup server 106, and more particularly a backup application, such as backup application 204.

As shown in FIG. 9, example process 900 begins in step 902, which includes saving, during backup or replication activity, to a database user accounts belonging to a certain access control group in the OS of Virtual Machines being backed up. In an embodiment, the access control group is local administrators group.

Subsequently, process 900 proceeds to step 904, which includes receiving a restoration request from a virtual machine. In an embodiment, the restoration request includes a machine identifier. The machine identifier can be a DNS name, an IP address assigned to virtual machine, a hypervisor-level VM identifier, or similar identifier. In another embodiment, a VM identifier can be automatically detected by matching a computer account (such as Active Directory computer account) to a VM. In an embodiment, the restoration request includes a user identifier of the user logged onto virtual machine. The user identifier can be the login information of the user logged onto the virtual machine, a user token, or similar identifier.

Subsequently, process 900 proceeds to step 906, which includes determining whether or not the user identifier contained in the restoration request can be matched to one or more of the user identifiers contained in the image level backups.

If the answer is no, process 900 proceeds to step 908, which includes denying the restoration request. Otherwise, process 900 proceeds to step 910, which includes accepting the restoration request, and then to step 912 which includes providing the user access to content of an image level backup of the virtual machine.

In step 914, process 900 includes using the machine identifier contained in the restoration request to limit visible scope of content of image level backups.

Figure 10:
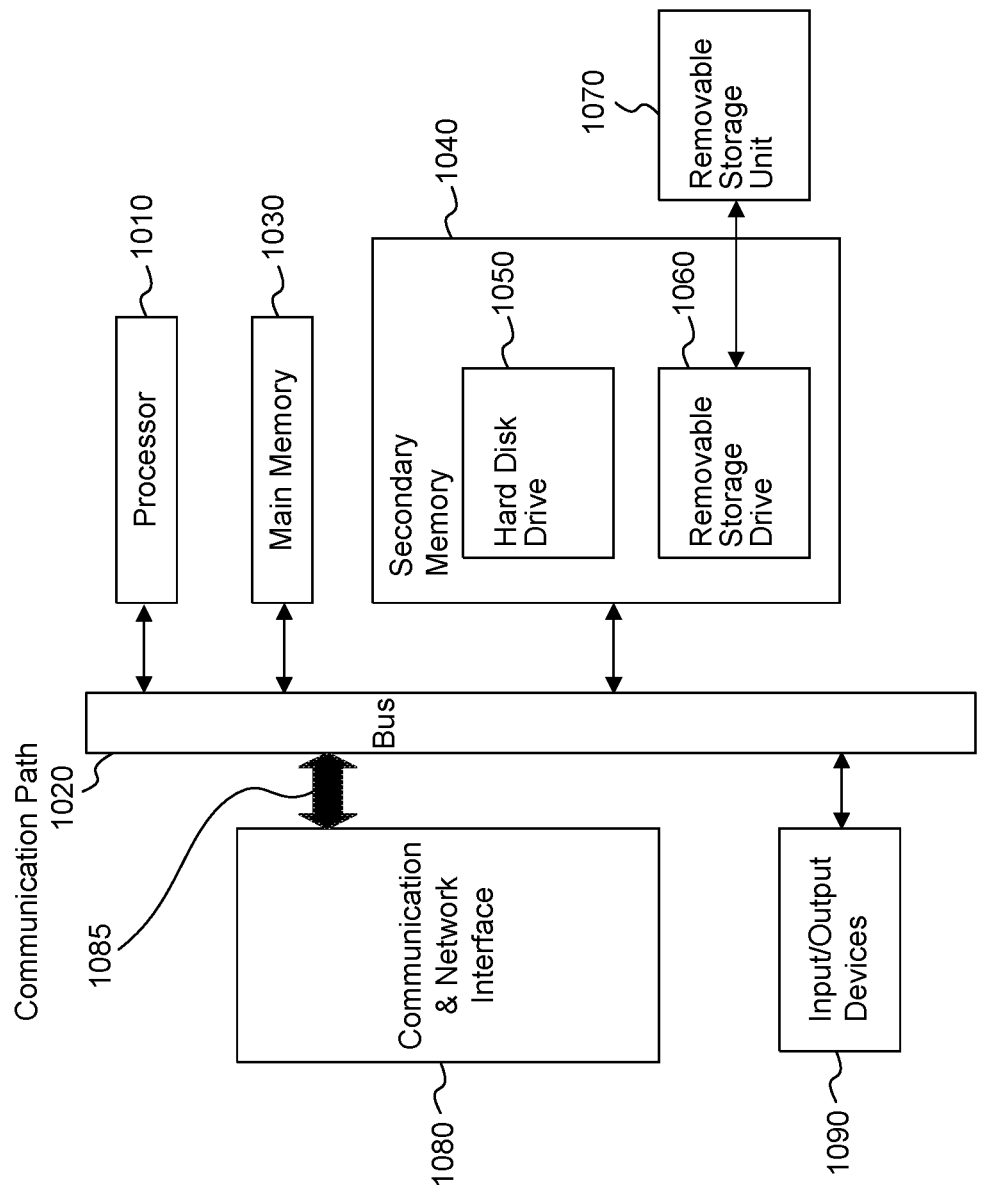
FIG. 10 is an example computer system in which embodiments can be practiced or implemented.

Various aspects of the embodiments described herein can be implemented by software, firmware, hardware, or a combination thereof. FIG. 10 illustrates an example computer system 1000 in which embodiments, or portions thereof, can be practiced or implemented as computer-readable code. For example, processes 300 of FIG. 3, 500 of FIG. 5, 700 of FIG. 7, and 900 of FIG. 9 can be implemented in system 1000. Various embodiments are described in terms of this example computer system 1000. After reading this description, it will become apparent to a person skilled in the relevant art how to implement embodiments using other computer systems and/or computer architectures.

Computer system 1000 includes one or more processors, such as processor 1010. Processor 1010 can be a special-purpose or a general-purpose processor. Processor 1010 is connected to a communication infrastructure 1020 (for example, a bus or network).

Computer system 1000 also includes a main memory 1030, preferably random access memory (RAM), and may also include a secondary memory 1040. Secondary memory 1040 may include, for example, a hard disk drive 1050, a removable storage drive 1060, and/or a memory stick. Removable storage drive 1060 may comprise a floppy disk drive, a magnetic tape drive, an optical disk drive, a flash memory, or the like. Removable storage drive 1060 reads from and/or writes to a removable storage unit 1070 in a well-known manner. Removable storage unit 1070 may comprise a floppy disk, magnetic tape, optical disk, etc. As will be appreciated by persons skilled in the relevant art(s), removable storage unit 1070 includes a computer-usable storage medium having stored therein computer software and/or data.

In alternative implementations, secondary memory 1040 may include other similar means for allowing computer programs or other instructions to be loaded into computer system 1000. Such means may include, for example, a removable storage unit 1070 and an interface 1020. Examples of such means may include a program cartridge and cartridge interface (such as that found in video game devices), a removable memory chip (such as an EPROM, or PROM) and associated socket, and other removable storage units 1070 and interfaces 1020 which allow software and data to be transferred from the removable storage unit 1070 to computer system 1000.

Computer system 1000 may also include a communication and network interface 1080. Communication interface 1080 allows software and data to be transferred between computer system 1000 and external devices. Communication interface 1080 may include a modem, a communication port, a PCMCIA slot and card, or the like. Software and data transferred via communication interface 1080 are in the form of signals which may be electronic, electromagnetic, optical, or other signals capable of being received by communication interface 1080. These signals are provided to communication interface 1080 via a communication path 1085. Communication path 1085 carries signals and may be implemented using wire or cable, fiber optics, a phone line, a cellular phone link, an RF link or other communication channels.

The network interface 1080 allows the computer system 1000 to communicate over communication networks or mediums such as LANs, WANs the Internet, etc. The network interface 1080 may interface with remote sites or networks via wired or wireless connections. The computer system 1000 may also include input/output/display devices 1090, such as keyboards, monitors, pointing devices, etc.

In this document, the terms "computer readable medium" and "computer usable medium" are used to generally refer to media such as removable storage unit 1070, removable storage drive 1060, and a hard disk installed in hard disk drive 1050. Computer program medium and computer usable medium can also refer to memories, such as main memory 1030 and secondary memory 1040, which can be memory semiconductors (e.g. DRAMs, etc.). These computer program products are means for providing software to computer system 1000.

Computer programs (also called computer control logic) are stored in main memory 1030 and/or secondary memory 1040. Computer programs may also be received via communication interface 1080. Such computer programs, when executed, enable computer system 1000 to implement the embodiments discussed herein. In particular, the computer programs, when executed, enable processor 1010 to implement the processes discussed above in FIGS. 3, 5, and 9. Accordingly, such computer programs represent controllers of the computer system 1000. Where an embodiment is implemented using software, the software may be stored in a computer program product and loaded into computer system 1000 using removable storage drive 1060, interface 1010, hard disk drive 1050 or communication interface 1080.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
a processor; and
a hypervisor comprising a virtual machine monitor, wherein the hypervisor is configured to:
launch, using the virtual machine monitor, one or more virtual machines, wherein a virtual machine of the one or more virtual machines comprises a backup application user interface, wherein the backup application user interface is configured to provide web-based access to a backup application implemented on a backup server remote from the system;
transmit, by the backup application user interface, a restoration request to the backup server, wherein the restoration request includes a machine identifier of the virtual machine, wherein the machine identifier of the virtual machine comprises one of a domain name system name, an Internet Protocol address assigned to the virtual machine, or a hypervisor-level virtual machine identifier; and
provide access, via the backup application user interface to a virtual machine image level backup associated with the virtual machine, wherein the access is provided responsive to the restoration request being accepted by the backup server based on the machine identifier of the virtual machine.

2. The system of claim 1, wherein the restoration request further includes a user identifier associated with a user and the hypervisor is configured to store an access control group, wherein the access is further provided based on determining that the user identifier belongs to the access control group.

3. The system of claim 2, wherein the access control group comprises a local administrator group.

4. The system of claim 2, wherein the user identifier is a user token containing information regarding at least one identifier of a user group to which the user is assigned.

5. The system of claim 1, wherein the one or more virtual machines comprises a second virtual machine, wherein the second virtual machine comprises a second backup application user interface.

6. The system of claim 1, wherein the virtual machine further comprises an administrator-only accessible storage location, and wherein the hypervisor comprises an application programming interface configured to communicate with the backup server, and wherein the hypervisor is further configured to:
receive, via the application programming interface from the backup server, an authentication cookie, wherein the authentication cookie is generated responsive to the restoration request being accepted by the backup server based on the machine identifier of the virtual machine; and
write, to the administrator-only accessible storage location, the authentication cookie.

7. The system of claim 6, wherein the access is further provided responsive to the hypervisor transmitting, via the backup application user interface, the authentication cookie to the backup server within a predetermined time interval.

8. A computer-implemented method, comprising:
launching, using a virtual machine monitor installed on a hypervisor, one or more virtual machines, wherein a virtual machine of the one or more virtual machines comprises a backup application user interface, wherein the backup application user interface is configured to provide web-based access to a backup application implemented on a backup server remote from the hypervisor;
transmitting, by the backup application user interface, a restoration request to the backup server, wherein the restoration request includes a machine identifier of the virtual machine, wherein the machine identifier of the virtual machine comprises one of a domain name system name, an Internet Protocol address assigned to the virtual machine, or a hypervisor-level virtual machine identifier; and
providing access, via the backup application user interface to a virtual machine image level backup associated with the virtual machine, wherein the access is provided responsive to the restoration request being accepted by the backup server based on the machine identifier of the virtual machine.

9. The method of claim 8, wherein the restoration request further includes a user identifier associated with a user and the hypervisor is configured to store an access control group, wherein the access is further provided based on determining that the user identifier belongs to the access control group.

10. The method of claim 9, wherein the access control group comprises a local administrator group.

11. The method of claim 9, wherein the user identifier is a user token containing information regarding at least one identifier of a user group to which the user is assigned.

12. The method of claim 8, wherein the one or more virtual machines comprises a second virtual machine, wherein the second virtual machine comprises a second backup application user interface.

13. A computer program product comprising a non-transitory computer readable medium including computer control logic stored therein, wherein the computer control logic, when executed by one or more processors, enables a method for user authorization for file level restoration from an image level backup, the method comprising:
    launching, using a virtual machine monitor installed on a hypervisor, one or more virtual machines, wherein a virtual machine of the one or more virtual machines comprises a backup application user interface, wherein the backup application user interface is configured to provide web-based access to a backup application implemented on a backup server remote from the hypervisor;
    transmitting, by the backup application user interface, a restoration request to the backup server, wherein the restoration request includes a machine identifier of the virtual machine, wherein the machine identifier of the virtual machine comprises one of a domain name system name, an Internet Protocol address assigned to the virtual machine, or a hypervisor-level virtual machine identifier; and
    providing access, via the backup application user interface to a virtual machine image level backup associated with the virtual machine, wherein the access is provided responsive to the restoration request being accepted by the backup server based on the machine identifier of the virtual machine.

14. The computer program product of claim 13, wherein the restoration request further includes a user identifier associated with a user and the hypervisor is configured to store an access control group, wherein the access is further provided based on determining that the user identifier belongs to the access control group.

15. The computer program product of claim 14, wherein the access control group comprises a local administrator group.

16. The computer program product of claim 14, wherein the user identifier is a user token containing information regarding at least one identifier of a user group to which the user is assigned.

17. The computer program product of claim 13, wherein the one or more virtual machines comprises a second virtual machine, wherein the second virtual machine comprises a second backup application user interface.

* * * * *